May 10, 1927.

J H. NIXON 1,628,181

CULTIVATOR

Filed Feb. 26, 1925

J. H. Nixon
INVENTOR

BY Victor J. Evans
ATTORNEY

May 10, 1927. 1,628,181
J. H. NIXON
CULTIVATOR
Filed Feb. 26, 1925 9 Sheets-Sheet 2

Fig. 2.

J. H. Nixon
INVENTOR
BY Victor J. Evans
ATTORNEY

WITNESS:
E. R. Ruppert.

May 10, 1927. 1,628,181
J. H. NIXON
CULTIVATOR
Filed Feb. 26, 1925 9 Sheets-Sheet 3

J. H. Nixon
INVENTOR
BY Victor J. Evans
ATTORNEY

May 10, 1927.

J H. NIXON 1,628,181

CULTIVATOR

Filed Feb. 26, 1925    9 Sheets-Sheet 5

J. H. Nixon
INVENTOR

BY Victor J. Evans
ATTORNEY

May 10, 1927.

J H. NIXON

1,628,181

CULTIVATOR

Filed Feb. 26, 1925

Patented May 10, 1927.

1,628,181

UNITED STATES PATENT OFFICE.

J HARTLEY NIXON, OF WOODSTOWN, NEW JERSEY.

CULTIVATOR.

Application filed February 26, 1925. Serial No. 11,810.

This invention relates to agricultural implements, particularly to cultivators, and has for its object the provision of a novel structure designed to be mounted upon a tractor of any ordinary or preferred type and to remain either permanently or removably attached thereto as preferred, the structure being formed as a complete and separate entity adapted to be manufactured and sold as such for mounting upon an already existing tractor. It will be understood that, while I have illustrated the invention as comprising a framework and other parts structurally separate from the tractor proper or from the power plant thereof, the invention is not necessarily limited to such a separate structure and can be embodied, as concerns many of its features, in a cultivator mechanism wherein the power plant forms a permanent part of the apparatus initially assembled therewith.

Another object of the invention is to provide a device of this character embodying a peculiar frame construction designed to be secured upon a tractor in embracing or enclosing relation thereto whereby to attain the proper rigidity and strength requisite for hard service.

Still another object of the invention is to provide a device of the character specified equipped with pedal operated steering means replacing the steering gear forming part of the original equipment of the tractor, the control being so arranged as to be within convenient reach of the driver's seat and consequently easily operable without the use of the hands, the hands being thereby free for operating other control devices with which the machine is equipped.

A further object is to provide a device of this character designed to be drawn along in straddling relation to a plurality of rows of growing plants, the device being equipped with a plurality of ground implement carrying members all of which are adjustable to facilitate working upon rows different distances apart, and certain of which may be moved by manual control means within ready reach of the operator to facilitate close cultivation of crooked rows.

The invention further contemplates the provision of a mechanism of the type and for the purpose specified which embodies various structural features of arrangement and combination which will insure ease in control and operation, positiveness in action, efficiency and durability in service and which will also be a general improvement in the art.

With the above and other objects and advantages in view, the invention consists in the details of construction and arrangement to be hereinafter more fully described and claimed and illustrated in the accompanying drawings, in which:

Referring more particularly to the drawings, I have shown the device as comprising a frame designated broadly by the numeral 1, which frame may be constructed of any suitable or preferred number of bars which might be of channel, angle or other formation and of any suitable material and proper weight to give the necessary strength. The general construction of this frame is such that it may be engaged upon a tractor indicated generally at 2 in embracing or enclosing relation thereto, the frame extending beyond the front and back and also beyond both sides of the tractor as clearly indicated in the drawings. While, as stated above, the frame may be varied within wide limits, I have, in the present instance, represented it as including a forward inverted U-shaped member 3 arranged in straddling relation to the forward portion of the tractor. Located at opposite sides of the tractor near the rear portion thereof are upright bars 4 which are preferably of channel formation and which embracingly engage against the edges of the tractor dash for stiffening purposes. These uprights may be bolted or otherwise secured to the dash if such is found advisable. Secured to the lower portions of the members 3 and 4 is a horizontally disposed U-shaped member 5 which projects considerably beyond the front of the tractor and which is preferably braced with respect to the member 3 by means of a diagonal member 6 located at each side. Stay or tie rods 7 arranged in crossed relation and secured to the members 3 and 4 may also be provided for making the structure more rigid. The frame may also include a horizontally disposed V-shaped member 8 secured to the upper portion of the member 3 with its arms diverging rearwardly and suitably secured to a horizontal cross member 9 which is suitably secured to the uprights 4. The frame also includes vertically arranged bar members 10 opposite to and spaced laterally away from the member 4 and secured to or formed integrally upon the horizontal cross bar 9. Suitably mounted at the lower ends of the vertical bar members 10 are ground engaging wheels 11 having flanges 12 thereon adapted to enter the ground and prevent side slipping of the machine. These wheels of course support the frame to a certain extent. The arms of the V-shaped member 8 project rearwardly beyond the cross bar 9 and connected therewith are suitable braces 13 which are diagonally arranged and which are secured to the vertical bars 10. As a matter of fact there may be any desired number of braces located at any desired points, a detail such as this being immaterial especially in view of the fact that very many changes may be made within the scope of the invention.

Figure 10:
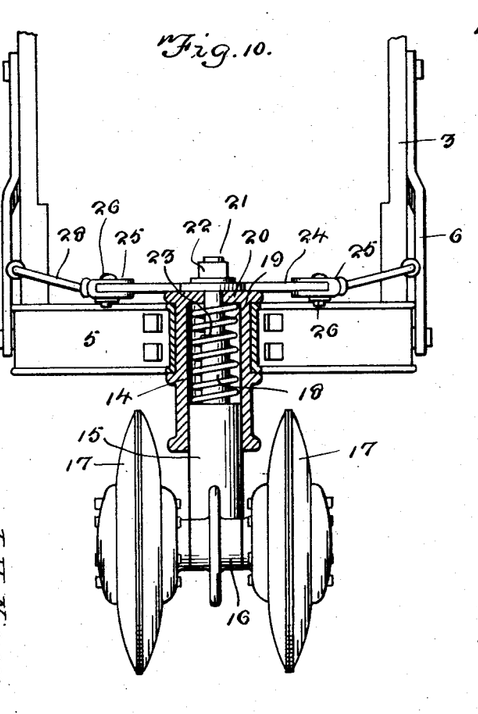
Figure 10 is a detail elevation, partly in section, showing the yieldable mounting for the steering wheels.
Figures 11, 12:
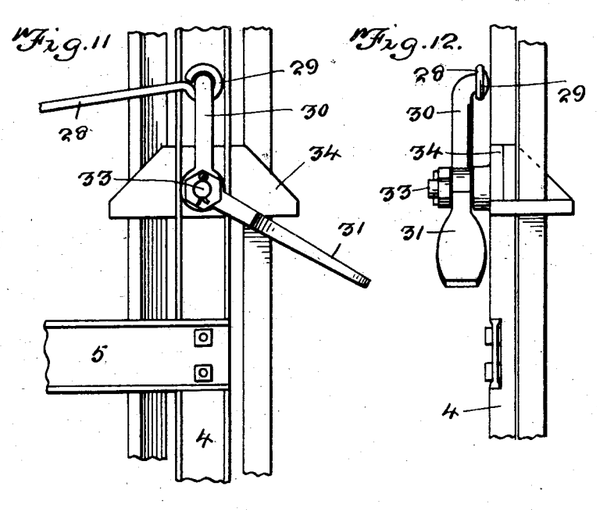
Figures 11 and 12 are fragmentary elevations showing the pedal means for effecting steering.

Mounted at the forward end of the frame member 5 is an open ended cylinder 14 of any desired construction and held in place by any preferred means. Slidably mounted within this cylinder is a member 15 carrying a bearing 16 rotatably supporting dirigible front wheels 17 of disk formation which are provided not only to partially support the forward end of the frame but also to effect steering of the entire machine. The member 15 is formed with a reduced extension 18 encircled by a coil spring 19 located within the cylinder 14 and abutting against the closed upper end 20 thereof. The extension 18 is further reduced to define what may be called a bolt 21 slidable through the closed end of the cylinder and carrying a suitable nut 22 or the like. Obviously, the forward end of the machine is resiliently supported by the spring 19 so that the frame of the machine may have a limited vertical movement with respect to the wheels 17. The formation of the bolt portion 21 on the reduced extension 18 defines a shoulder 23 which is adapted to engage against the under side of the closed upper end 20 of the cylinder 14 whereby to serve as a stop for limiting the relative movement. In order that the machine may be steered, I may provide a cross bar 24 slidably but nonrotatably engaged upon the upper end portion of the bolt 21, this particular manner of mounting permitting this cross member to remain in engagement with the upper end 20 of the cylinder 14 even though the frame should move downwardly with respect to the wheels 17 with the spring 19 under compression. Pivotally and slidably connected with the ends of the cross piece 24 are clevises 25, the connections preferably consisting of suitable pins or bolts 26 passing through slots 27 in the clevises so as to permit the necessary movement. These clevises are carried by rods 28 which extend rearwardly of the machine and which are pivotally connected at 29 with arms 30 of pedals 31 located in convenient reach of the feet of an operator riding on a suitable seat 32 mounted at the proper location on the frame as indicated. Obviously, the exact manner of mounting the pedals may be varied within wide limits though I have illustrated them as pivoted upon trunnions or stubs 33 projecting from brackets 34 suitably secured to the uprights 4.

Figures 13, 14, 15, 16:
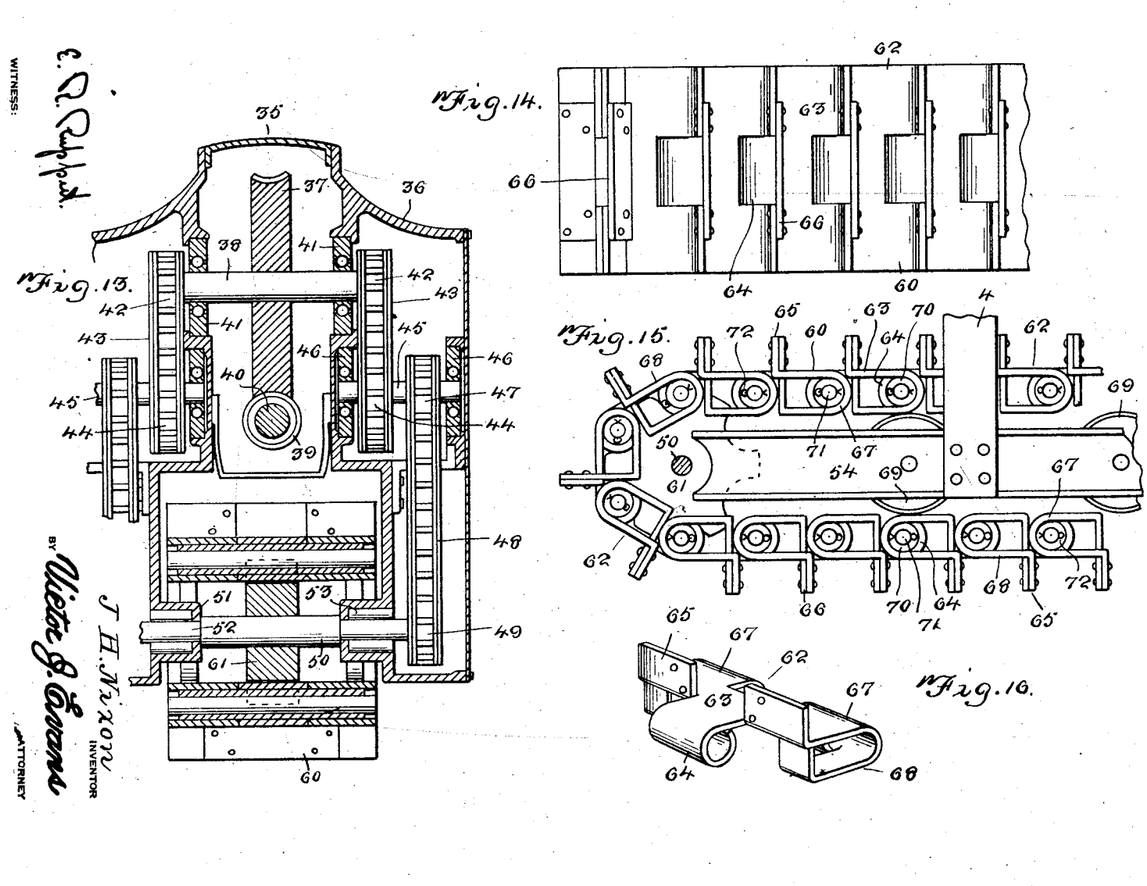
Figure 13 is a detail sectional view through the transmission mechanism for the caterpillar drive.
Figure 14 is a detail plan view of a portion of the caterpillar structure.
Figure 15 is a side elevation thereof.
Figure 16 is a detail perspective view of one of the links of the caterpillar drive.

In order that the machine may be propelled along the ground, I provide a caterpillar drive which takes the place of the usual wheel drive provided on tractors. However, this caterpillar drive is of such construction as to be operated by the transmission mechanism which forms part of the original equipment of the tractor so that the various control levers, pedals and the like of the transmission need not be disturbed inasmuch as they are employed in the control of the driving mechanism. In carrying out this feature of the invention, the rear axle housings of the tractor are disconnected and removed from the central portion of the housing indicated at 35 and are replaced by housing members 36. Within this central portion 35 is located the worm wheel 37 carried by a shaft 38 and driven by a worm 39 on the worm shaft 40 of the tractor transmission mechanism. Ordinarily, the shaft 38 is of considerable length so as to drive the rear wheels of the tractor, but in applying my invention this shaft may be cut off or replaced by a shorter one, as preferred. The housing members 36 are formed to accommodate the bearings 41 for the shaft 38, these bearings forming part of the original equipment in the transmission mechanism. The shaft 38 of course projects outwardly beyond the bearing members 41 and secured upon the projecting ends are sprockets 42 about which are trained chains 43 in turn peripherally engaged with other sprockets 44 on short shafts 45 journaled within bearings 46 suitably mounted in the housings 36. The shafts 45 carry sprockets 47 engaged by chains 48 which are in turn trained about other sprockets 49 on the rear shaft 50 of the caterpillar drive mechanism. Suitable bearings 51 are provided for the reduced end portions 52 of this shaft 50, these bearings including rollers 53. The caterpillar drive mechanism further includes longitudinally extending bars 54 which extend to the housings 36 and which are secured to the lower ends of the uprights 4. The numeral 55 designates the front cross member of the tractor or a member which may be inserted to replace the usual front cross member, and secured thereto are castings 56 which are also bolted or otherwise suitably secured to the lower converging ends of the U-shaped front frame member 3. The castings are also secured to the bars 54 and are formed with bearing 57 for the front shaft 58 of the caterpillar drive. The shaft 58 carries a sprocket 59 for driving the caterpillar chain designated broadly by the numeral 60, this chain being of course also engaged about a sprocket 61 on the shaft 50.

While it is of course true that the caterpillar chain may be of any desired specific construction, I have in the present instance illustrated it as including a plurality of links 62 each of which may, in actual practice, be formed from a single piece of sheet steel of suitable gage cut and stamped into form. Each link is here shown as including a body portion 63, slit or cut at spaced points to define a central tongue which is coiled or curled to form a knuckle 64. The material outwardly of the slits or cuts is upstruck to define traction lugs 65 which are of course spaced apart but which are connected by transverse cleats 66 riveted or otherwise secured thereto. Outwardly of these slits or cuts the material is bent in a direction opposite to the direction of extension of the tongue at the center to define bearing portions 67 which are of course spaced apart. When a series of the links or units are placed together, it is obvious that the knuckle 64 of one will be disposed between the bearing portions 67 of the one next adjacent, there being a true interfitting relation. The end portions of each link are also formed to provide elongated portions 68 which will constitute a track, the tracks at the opposite sides of the caterpillar chain travelling upon and being supported by suitable rollers 69 journaled between the bars 54. Mounted within the interfitting knuckles 64 and the bearing portions 67 of these successive links are suitable bushings 70 through which extend shafts 71 held against longitudinal displacement as for instance by means of cotter pins 72 or their equivalent. While the details of the caterpillar drive chain have been given it should be distinctly understood that some other type might be employed if found advisable for any reason whatsoever. Obviously, when the tractor mechanism is in operation power will be applied to the shaft 50 which will in turn drive the caterpillar chain so that the latter will effect the desired propelling action.

Suitably mounted at the outer ends of the cross member 9 are bearings 73 through which are slidably and rotatably engaged depending bars 74 which have their lower ends formed to provide arms 75 curved rearwardly and outwardly. It is preferable that these arms be braced by means of transversely extending tie rods 76. It may also be preferable to provide other braces 77, and for a reason to be hereinafter explained those portions of the arm members 75 adjacent the vertical portions 74 are upwardly offset as indicated at 78. Furthermore, the curved portions of these arms are represented as being of double thickness. The arms 75 are intended to carry ground engaging implements to be described.

Figure 1:
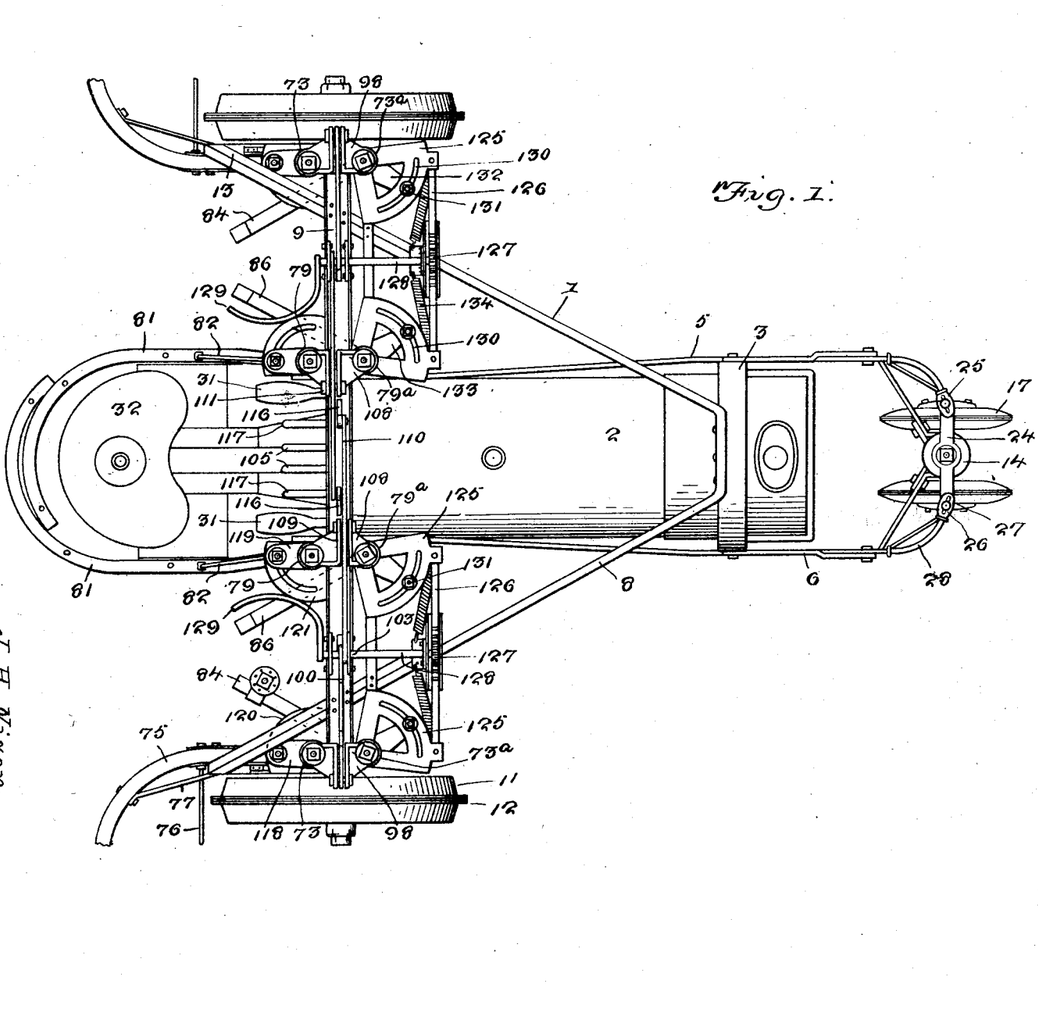
Figure 1 is a top plan view of the complete device.
Figure 2:
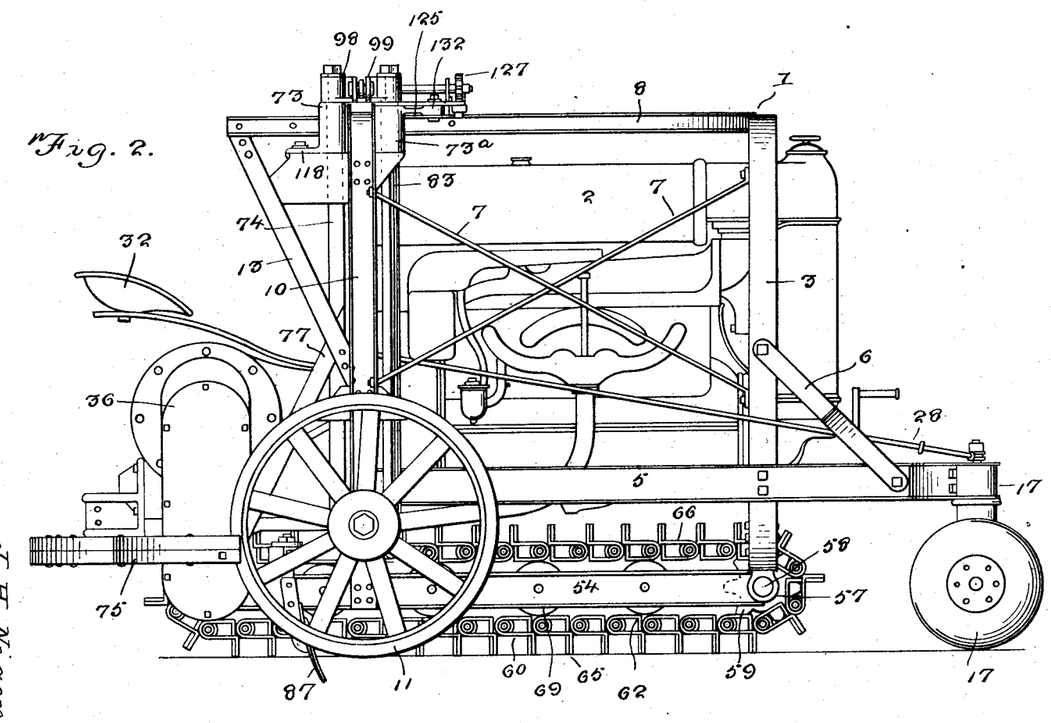
Figure 2 is a side elevation thereof.
Figure 3:
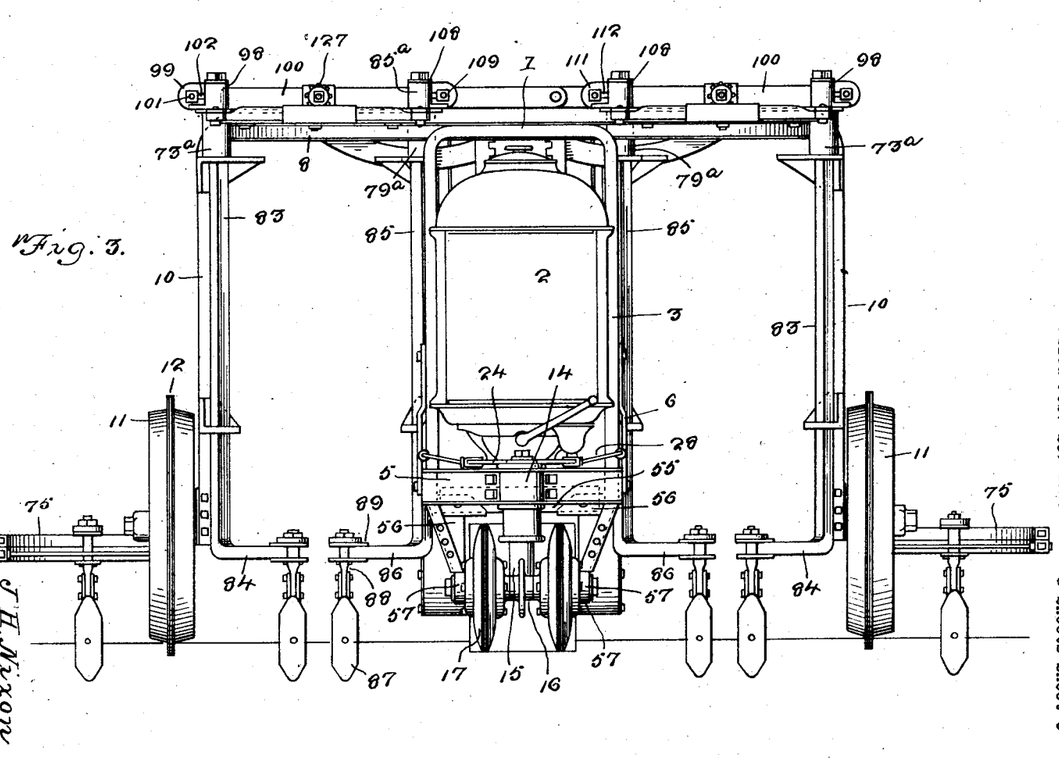
Figure 3 is a front elevation.
Figure 4:
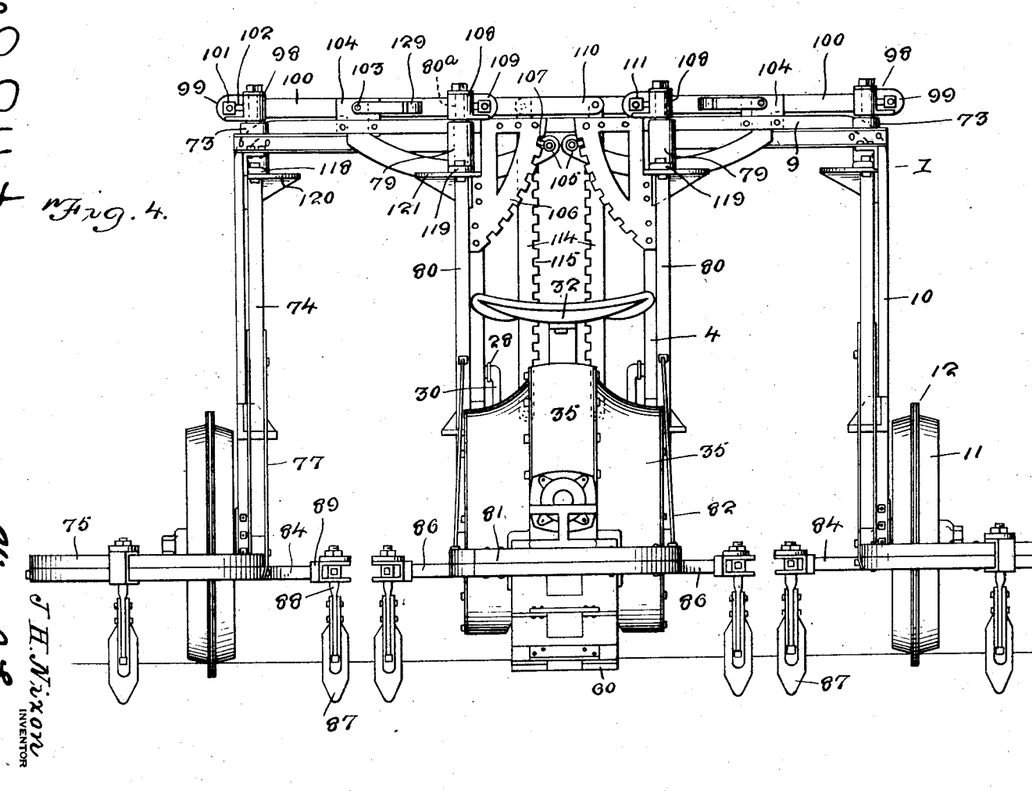
Figure 4 is a rear elevation with all of the ground engaging elements in their lowered or operative position.

Carried by the uprights 4 are bearing members 79 through which are slidable and rotatable vertically depending bar members 80 having their lower ends rearwardly extended to define arms 81 which are oppositely curved and toward each other as shown in Figure 1. These arms are similar to the arms 75, are likewise upwardly offset and are adapted to support ground engaging elements or cultivator teeth to be described. Furthermore, these members are reenforced by braces indicated at 82.

Slidably and rotatably mounted through other bearing members 73$^a$ and located in advance of the members 74 are other depending bars 83 carrying rearwardly extending arms 84 located preferably in the same plane as the above described arms 75 and 81. Rotatable and slidable through bearing members 79$^a$ are depending bars 85 located in advance of the bars 80 and carrying at their lower ends rearwardly extending arms 86 similar to the arms 84.

Figures 8, 9, 20, 21, 22:
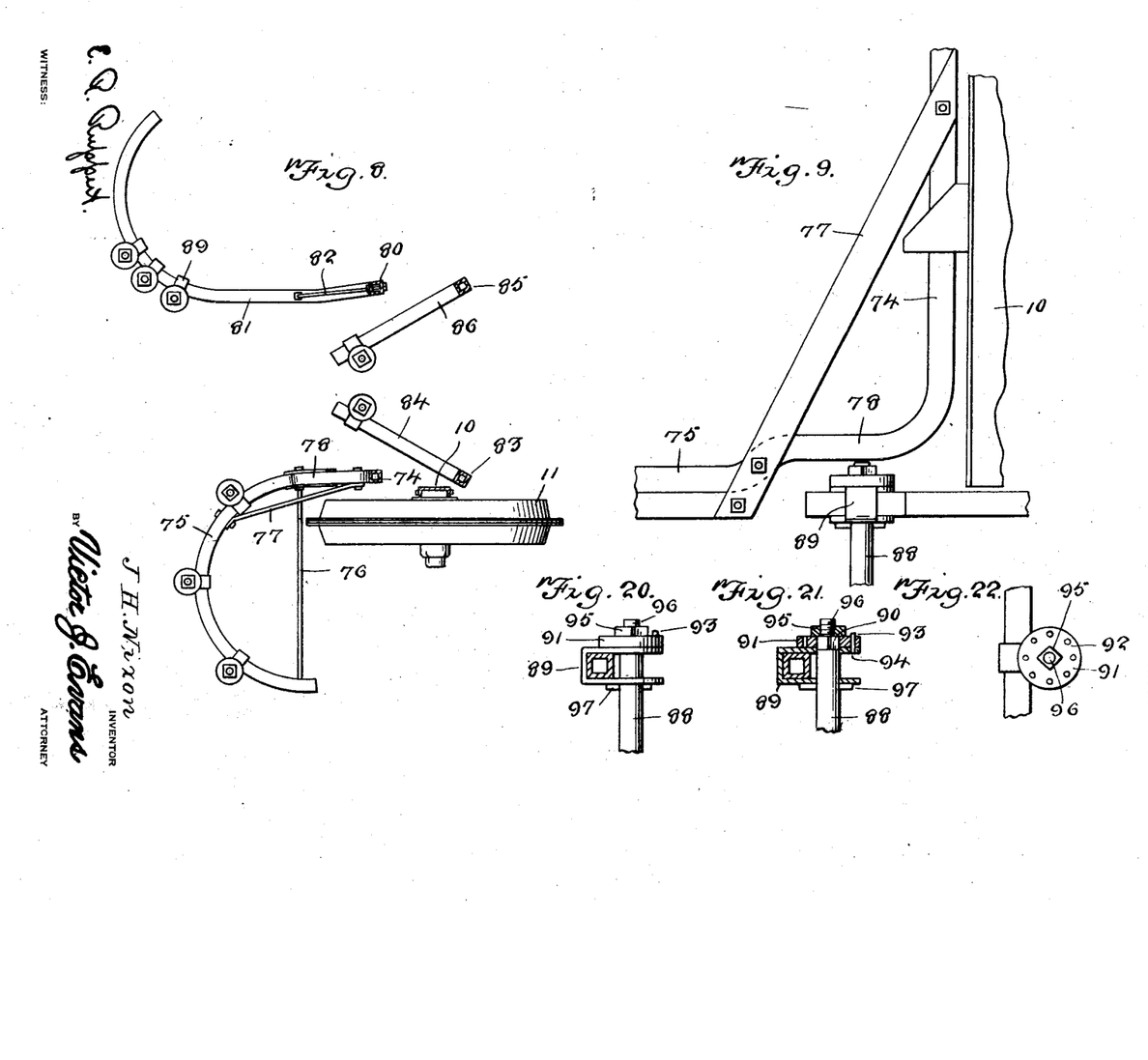
Figure 8 is a horizontal section shown rather diagrammatically illustrating different arrangements of the ground engaging elements.
Figure 9 is a fragmentary side elevation showing a certain detailed feature.
Figure 20 is an elevation at right angles to Figure 19 with the implement support in section.
Figure 21 is a detail section through the implement support and one of the implements mounted thereon showing the adjustment feature.
Figure 22 is a plan view of what is shown in Figures 19 to 21 inclusive.

All of the arms 75, 81, 84, and 86 are adapted to carry the same type of ground engaging implements such as the cultivator teeth indicated at 87. As all of these devices are the same a description of one will suffice. The blade, shovel, tooth, disk or the like 87 is carried by a shank 88 rotatably engaged through a U-shaped clip 89 and having a squared upper end portion 90 carrying a disk 91 formed with a circumferential series of holes 92 through any one of which may be passed a securing pin 93 which also passes through a suitable hole 94 in the upper arm of the clip 89. The parts are secured in position by means of a suitable nut 95 engaged upon the reduced and threaded upper end 96 of the shank. This nut will prevent longitudinal movement in one direction, and movement in the other direction may be prevented by means of a transverse cotter or other pin 97 passing through the shank and engaging against the under side of the lower arm or clip 89. Any desired number of these ground engaging implements may be applied to the various arms and it is obvious that they may be spaced any desired distances apart. In Figure 8 I have shown one of the arms 75 as carrying three of the ground engaging implements located comparatively far apart whereas in the same Figure I have shown one of the arms 81 carrying three of the ground engaging elements located very close together, the arrangement being immaterial but depending of course upon the nature of the crop to be cultivated and other conditions which may exist. The provision of the circumferential series of holes is very important inasmuch as it is obvious that when the ground engaging implements are mounted upon the curved arms 75 and 81 and are adjusted therealong, unless some means be provided whereby the shank of the implement could be rotatably adjusted, certain of the teeth would face directly forwardly while others would be presented edgewise to the line of draft. This of course would not be a practical feature and it is for this reason that the adjustment has been provided, so that regardless of the position of the implements along the curved arms they may be regulated so as to face forwardly and exert the proper digging action upon the surface traveled over.

Figures 5, 17, 18:
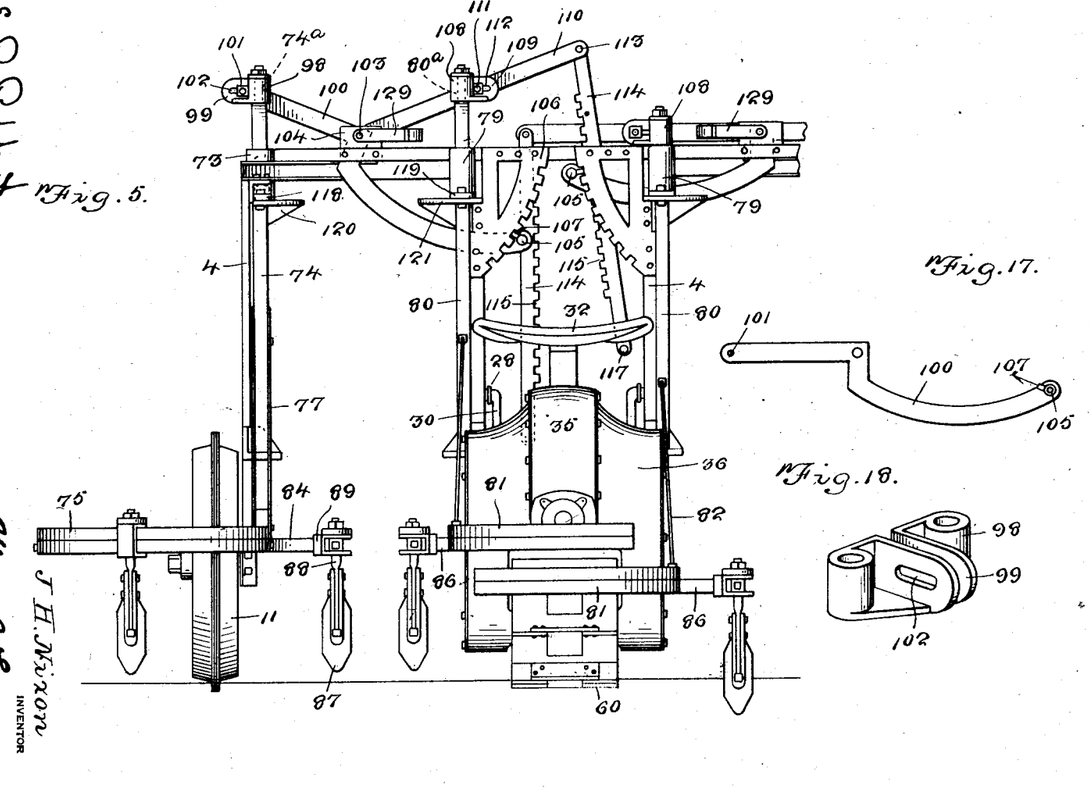
Figure 5 is a fragmentary rear elevation showing certain of the ground engaging elements as elevated into inoperative position.
Figure 17 is a detail elevation of one of the control levers for raising and lowering the ground engaging implements or elements.
Figure 18 is a detail perspective view of one of the brackets mounted on the implement carrying bars.

In order that the members 74 and 83 may be moved vertically for lifting the ground engaging elements out of operative position, I provide a bracket device 98 mounted upon the upper ends of the adjacent members 74 and 83, these members having reduced cylindrical portions 74$^a$ and 83$^a$, respectively, acting as trunnions where they pass through the brackets. Each bracket 98 includes spaced web portions 99 between which is arranged the outer end of a vertically movable shifting lever 100, the lever being pivoted to the bracket 98 by means of a suitable bolt 101 or the like passing through elongated slots 102 in the web 99 so as to prevent binding when the lever is swung. The levers 100 are suitably pivoted at 103 on brackets 104 and their inner ends approach comparatively close to each other and terminate in handles 105 located within convenient reach of the operator sitting upon the seat 32.

In order that the members 74 and 83 may be held at any desired position so that the ground engaging implements carried thereby may be held either entirely out of engagement with the ground or penetrating thereinto to any desired extent, I provide a pair of notched segments 106 suitably secured upon the frame and adapted to be engaged by lugs 107 projecting from the handles 105. It is preferable that the handles 105 be longitudinally movable in order that the lugs 107 thereon may be within or disengaged from the notches in the segments 106 so that the levers may be swung for adjusting the positions of the members 74 and 83.

In order that the members 80 and 85 carrying the arms 81 and 86, respectively, may be similarly moved in a vertical direction to control the depth of penetration of the ground engaging implements carried thereby or to lift the ground engaging implements out of engagement with the ground as for instance when the machine is travelling idle, I provide bracket devices 108 mounted on the upper ends of these members 80 and 85, the members having reduced portions 80$^a$ and 85$^a$ constituting trunnions where they pass through these brackets. These brackets may be identical in construction with the brackets 98 and include webs 109 spaced apart for the accommodation of shifting levers 110 which are pivoted between the webs by means of suitable bolts 111 or the like passing through elongated slots 112 in the webs so as to prevent binding. These levers are pivoted on the pivots 103 which constitute the pivot points for the levers 100 and connected with the inner ends thereof at the points indicated at 113 are depending control rods or bars 114 formed throughout the major portion of their length with notches 115, any selected one of which may be engaged with the edge of a slot 116 in the member 9, one of these slots being provided for the accommodation and passage of each of the control rods or bars 114. At their lower ends, the rods or bars 114 are equipped with handles 117 located within convenient reach of the driver or operator so that they may be grasped to effect lateral swinging of the members 114 and subsequent substantially vertical movement thereof so as to swing the levers 110 and thereby control the positions of the members 80 and 85 carrying the inner set of ground engaging implements.

Figures 6, 7, 19:
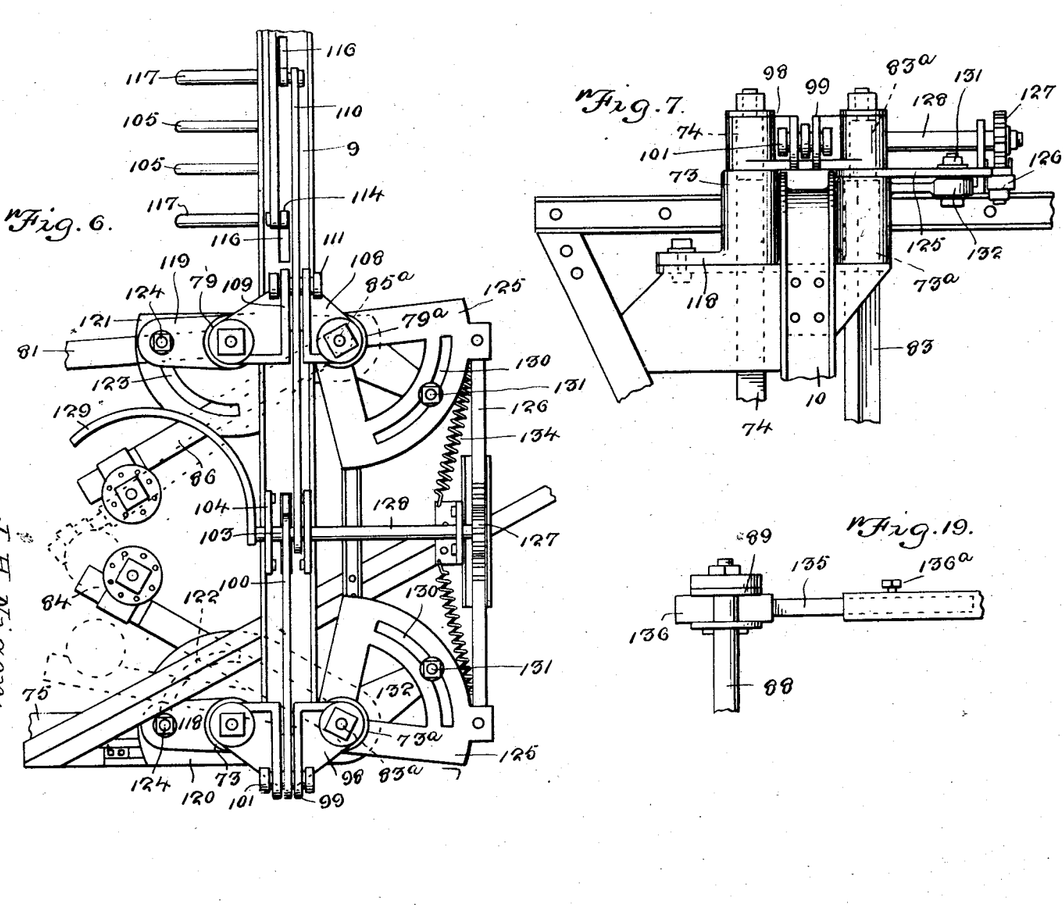
Figure 6 is a fragmentary plan view showing the adjustment features on a larger scale.
Figure 7 is a fragmentary side elevation or a view looking at the end of what is shown in Figure 6 so as to illustrate the adjusting feature from a different position or angle.
Figure 19 is a fragmentary elevation showing the mounting of one of the ground engaging implements.

It is intended that the members 74 and 80 be capable of swinging adjustment depending upon the distance between successive rows of growing plants to be cultivated, and for this reason the bearing members 73 and 79 are equipped with laterally extending arms 118 and 119, respectively, movable over guide brackets 120 and 121 suitably mounted on the stationary frame. These brackets are formed with arcuate slots 122 and 123, respectively, and the arms 118 and 119 are adapted to be secured in any desired adjusted position by means of suitable bolts 124. This adjustment is intended to be left set after it has once been made depending upon the distance between rows. During the course of cultivation of a field, it frequently occurs that a row is crooked or that some other condition may exist at some part which makes it advisable to shift the position of certain ground engaging implements in order to cultivate closely while avoiding tearing up any of the plants. For this reason, I have provided a manual means for swinging the arms 84 and 86 to one side or the other, such means being under direct control of the operator and being capable of being actuated at a moment's notice and while the machine is travelling along. In carrying out this feature, I provide at each side of the machine pivotally mounted segments 125 connected by a rack bar 126 pivotally attached thereto. The rack is engaged by a pinion 127 carried by a shaft 128 suitably journaled through the frame and equipped with an operating handle 129 located within convenient reach of the driver. The segments 125 are formed with arcuate slots 140 through which pass suitable securing bolts or the like 131 for adjustably securing arms 132 and 133 projecting laterally from the members 73ª and 79ª, respectively. The adjustment of the arms 132 and 133 with respect to the segments will determine the angle at which the arms 84 and 86 extend toward each other and it is obvious that by making different adjustments these arms may be caused to approach each other to a greater or less extent as may be necessary according to the crop being cultivated. It may be preferable to provide coils or other springs 134 stationarily anchored at one end and connected with adjacent segment members 125 for the purpose of normally maintaining an intermediate or normal position and returning the parts to such normal position after actuation to swing the arms 84 and 86 in one direction or the other as the case may be.

The arms 84 and 86 may each be of one piece if desired, though I have shown them as hollow and telescopically receiving shank or extension elements 135 on terminals 136 upon which the clips 89 of the ground engaging elements are mounted. By this means, the position of the implements or their distance from the pivot points of the arms may be varied to a considerable extent, as may be necessary. Any desired adjustment may be maintained by means of a set screw, or the like, 136ª. The upward offsetting of the arms 75 and 81, above described, is to permit extreme lateral swinging of the short arms 84 and 86, under certain conditions.

From the foregoing description and study of the drawings it is believed that the construction, operation and advantages of the machine will be readily apparent to one skilled in the art without further elaboration especially as the details of adjustment, mounting of drive mechanism and arrangement of ground engaging elements have been appropriately set forth from time to time.

While I have shown and described the preferred embodiment of the invention, it should be understood that I reserve the right to make such changes in the form, construction and arrangement of parts as will not depart from the spirit of the invention or the scope of the subjoined claims.

Having thus described the invention, I claim:

1. In a cultivator of the class described, the combination with a main frame, a power driven supporting and driving means for the frame, and a manually controllable steering means for the frame in advance of the steering means, all of the said parts being narrow and adapted to travel between two rows of plants; of a wheel supported auxiliary frame located adjacent the rear of the main frame at one side thereof and arched to pass over a row of plants; two sets of ground engaging cultivating tools carried respectively by the main frame and the auxiliary frame; means for adjusting the tools carried by the main frame vertically in parallelism; and other means supported in part on the auxiliary frame and operable from the main frame for adjusting the tools carried by the auxiliary frame vertically in parallelism.

2. In a cultivator of the class described, the combination with a main frame, a power driven supporting and driving means for the frame, and a manually controllable steering means for the frame in advance of the steering means, all of the said parts being narrow and adapted to travel between two rows of plants; of a wheel supported auxiliary frame located adjacent the rear of the main frame at one side thereof and arched to pass over a row of plants; two sets of ground engaging cultivating tools carried respectively by the main frame and the auxiliary frame; and means operable from the main frame for laterally adjusting some of the tools of both sets relatively to their respective frames.

3. In a cultivator of the class described, the combination with a main frame, a power driven supporting and driving means for the frame, and a manually controllable steering means for the frame in advance of the steering means, all of the said parts being narrow and adapted to travel between two rows of plants; of a wheel supported auxiliary frame located adjacent the rear of the main frame at one side thereof and arched to pass over a row of plants; two sets of ground engaging cultivating tools carried respectively by the main frame and the auxiliary frame; and means operable from the main frame for laterally adjusting some of the tools of each of the two sets simultaneously and in the same directions.

4. In a cultivator of the class described, the combination with a main frame, a power driven supporting and driving means for the frame, and a manually controllable steering means for the frame in advance of the steering means, all of the said parts being narrow and adapted to travel between two rows of plants; of a wheel supported auxiliary frame located adjacent the rear of the main frame at one side thereof and arched to pass over a row of plants; two sets of ground engaging cultivating tools carried respectively by the main frame and the auxiliary frame; means for adjusting the tools carried by the main frame vertically in parallelism; other means supported in part on the auxiliary frame and operable from the main frame for adjusting the tools carried by the auxiliary frame vertically in parallelism; and other means also operable from the main frame for laterally adjusting some of the tools of each of the two sets simultaneously and in the same directions.

5. In a cultivator of the class described, the combination with a main frame, a power driven supporting and driving means for the frame, and a manually controllable steering means for the frame, all of the said parts being narrow and adapted to travel between two rows of plants; of a wheel supported auxiliary frame located adjacent the rear of the main frame at one side thereof and arched to pass over a row of plants; two closely adjacent angularly adjustable vertical bars carried by the auxiliary frame adjacent the outer side of the last said row; and arms connected respectively to the said bars near the lower ends thereof and adapted for carrying cultivating tools.

6. In a cultivator of the class described, the combination with a main frame, a power driven supporting and driving means for the frame, and a manually controllable steering means for the frame, all of the said parts being narrow and adapted to travel between two rows of plants; of a wheel supported auxiliary frame located adjacent the rear of the main frame at one side thereof and arched to pass over a row of plants; two closely adjacent angularly adjustable vertical bars carried by the auxiliary frame adjacent the outer side of the last said row, one of the said bars being directly in front of the other; and arms connected to the respective bars near the lower ends thereof and adapted for carrying cultivating tools, both of the said arms extending in generally rearward directions.

7. In a cultivator of the class described, the combination with a main frame, a power driven supporting and driving means for the frame, and a manually controllable steering means for the frame, all of the said parts being narrow and adapted to travel between two rows of plants; of a wheel supported auxiliary frame located adjacent the rear of the main frame at one side thereof and arched to pass over a row of plants; two closely adjacent angularly adjustable vertical bars carried by the auxiliary frame adjacent the outer side of the last said row; arms connected respectively to the said bars near the lower ends thereof and adapted for carrying cultivating tools; and means for vertically adjusting both of the bars simultaneously together with the arms connected thereto.

8. In a cultivator of the class described, the combination with a main frame, a power driven supporting and driving means for the frame, and a manually controllable steering means for the frame, all of the said parts being narrow and adapted to travel between two rows of plants; of a wheel supported auxiliary frame located adjacent the rear of the main frame at one side thereof and arched to pass over a row of plants; two closely adjacent angularly adjustable vertical bars carried by the auxiliary frame adjacent the outer side of the last said row; arms connected respectively to the said bars near the lower ends thereof and adapted for carrying cultivating tools; and means adjacent the upper ends of the bars for controlling the angular adjustment thereof.

9. In a cultivator of the class described, the combination with a main frame, a power driven supporting and driving means for the frame, and a manually controllable steering means for the frame, all of the said parts being narrow and adapted to travel between two rows of plants; of a wheel supported auxiliary frame located adjacent the rear of the main frame at one side thereof and arched to pass over a row of plants; two closely adjacent angularly adjustable vertical bars carried by the auxiliary frame adjacent the outer side of the last said row; arms connected respectively to the said bars near the lower ends thereof and adapted for carrying cultivating tools; means for vertically adjusting both of the bars simultaneously together with the arms connected thereto; and arms adjacent the upper ends of the respective bars for controlling the angular adjustment thereof, the said arms being held against vertical adjustment with the bars.

10. In a cultivator of the class described, the combination with a main frame, a power driven supporting and driving means for the frame, and a manually controllable steering means for the frame, all of the said parts being narrow and adapted to travel between two rows of plants; of a wheel supported auxiliary frame located adjacent the rear of the main frame at one side thereof and arched to pass over a row of plants; two closely adjacent angularly adjustable vertical bars carried by the auxiliary frame adjacent the outer side of the last said row; arms connected respectively to the said bars near the lower ends thereof and adapted for carrying cultivating tools; arms adjacent the upper ends of the respective bars for controlling the angular adjustment thereof; and two segments for holding the respective adjusting arms in adjusted position, one of the said segments being in fixed relation to the frame and the other being angularly movable about the axis of the corresponding bar.

11. In a cultivator of the class described, the combination with a main frame, a power driven supporting and driving means for the frame, and a manually controllable steering means for the frame, all of the said parts being narrow and adapted to travel between two rows of plants; of a wheel supported auxiliary frame located adjacent the rear of the main frame at one side thereof and arched to pass over a row of plants; two closely adjacent angularly adjustable vertical bars carried by the auxiliary frame adjacent the outer side of the last said row; arms connected respectively to the said bars near the lower ends thereof and adapted for carrying cultivating tools; two other closely adjacent angularly adjustable vertical bars carried by the main frame adjacent the inner side of the last said row; and arms connected respectively to the last said bars near the lower ends thereof and adapted for carrying cultivating tools.

12. In a cultivator of the class described, the combination with a main frame, a power driven supporting and driving means for the frame, and a manually controllable steering means for the frame, all of the said parts being narrow and adapted to travel between two rows of plants; of a wheel supported auxiliary frame located adjacent the rear of the main frame at one side thereof and arched to pass over a row of plants; two closely adjacent angularly adjustable vertical bars carried by the auxiliary frame adjacent the outer side of the last said row; arms connected respectively to the said bars near the lower ends thereof and adapted for carrying cultivating tools; two other closely adjacent angularly adjustable vertical bars carried by the main frame adjacent the inner side of the last said row; arms connected respectively to the last said bars near the lower ends thereof and adapted for carrying cultivating tools; and two independent means respectively adapted for vertically adjusting the first said bars simultaneously and the second said bars simultaneously.

13. In a cultivator of the class described, the combination with a main frame, a power driven supporting and driving means for the frame, and a manually controllable steering means for the frame, all of the said parts being narrow and adapted to travel between two rows of plants; of a wheel supported auxiliary frame located adjacent the rear of the main frame at one side thereof and arched to pass over a row of plants; two closely adjacent angularly adjustable vertical bars carried by the auxiliary frame adjacent the outer side of the last said row; arms connected respectively to the said bars near the lower ends thereof and adapted for carrying cultivating tools; two other closely adjacent angularly adjustable vertical bars carried by the main frame adjacent the inner side of the last said row; arms connected respectively to the last said bars near the lower ends thereof and adapted for carrying cultivating tools; two pairs of arms adjacent the upper ends of the bars of the respective pairs; means for holding one arm of each pair in adjusted position; and means connecting the other arm of one pair with the other arm of the other pair for simultaneous angular adjustment.

14. In a cultivator of the class described, the combination with a main frame, a power driven supporting and driving means for the frame, and a manually controllable steering means for the frame, all of the said parts being narrow and adapted to travel between two rows of plants; of a wheel supported auxiliary frame located adjacent the rear of the main frame at one side thereof and arched to pass over a row of plants; two closely adjacent angularly adjustable vertical bars carried by the auxiliary frame adjacent the outer side of the last said row; arms connected respectively to the said bars near the lower ends thereof and adapted for carrying cultivating tools; two other closely adjacent angularly adjustable vertical bars carried by the main frame adjacent the inner side of the last said row; arms connected respectively to the last said bars near the lower ends thereof and adapted for carrying cultivating tools; two pairs of arms adjacent the upper ends of the bars of the respective pairs; means for holding one arm of each pair in adjusted position; a transverse link connecting the other arm of one pair with the other arm of the other pair; and means comprising a rack and pinion for moving the said link endwise to adjust the last said arms simultaneously.

15. In a cultivator of the class described, the combination with a main frame, a power driven supporting and driving means for the frame, and a manually controllable steering means for the frame, all of the said parts being narrow and adapted to travel between two rows of plants; of a wheel supported auxiliary frame located adjacent the rear of the main frame at one side thereof and arched to pass over a row of plants; two closely adjacent angularly adjustable vertical bars carried by the auxiliary frame adjacent the outer side of the last said row; arms connected respectively to the said bars near the lower ends thereof and adapted for carrying cultivating tools; two other closely adjacent angularly adjustable vertical bars carried by the main frame adjacent the inner side of the last said row; arms connected respectively to the last said bars near the lower ends thereof and adapted for carrying cultivating tools; two pairs of arms adjacent the upper ends of the bars of the respective pairs; four segments for holding the respective adjusting arms in adjusted positions, two of the segments being in fixed relation to the corresponding frames and the other two segments being angularly movable respectively about the axes of the corresponding bars; and a link connecting the last said segments for causing them to move simultaneously.

16. In a cultivator of the class described, the combination with a main frame, a power driven supporting and driving means for the frame, and a manually controllable steering means for the frame in advance of the steering means, all of the said parts being narrow and adapted to travel between two rows of plants; of two wheel supported auxiliary frames located adjacent the rear of the main frame at opposite sides thereof and each arched to pass over a row of plants; four groups of ground engaging cultivating tools of which two are carried by the main frame and two by the respective auxiliary frames; and mechanism carried in part on the respective auxiliary frames and operable from the main frame for adjusting the tools of any group independently of the others vertically in parallelism.

17. In a cultivator of the class described, the combination with a main frame, a power driven supporting and driving means for the frame, and a manually controllable steering means for the frame, all of the said parts being narrow and adapted to travel between two rows of plants; of two wheel supported auxiliary frames located at opposite sides of the main frame and each arched to pass over a row of plants; four groups of cultivating tools of which two are carried by the main frame and two by the respective auxiliary frames; and means for laterally adjusting the tools of any group independently of the others.

18. In a cultivator of the class described, the combination with a main frame, a power driven supporting and driving means for the frame, and a manually controllable steering means for the frame, all of the said parts being narrow and adapted to travel between two rows of plants; of two wheel supported auxiliary frames located at opposite sides of the main frame and each arched to pass over a row of plants; four tool arms pivoted for movement about vertical axes, two of the arms being carried by the main frame and two by the respective auxiliary frames; cultivating tools on the several arms; and means for locking the several arms in different positions of angular adjustment.

19. In a cultivator of the class described, the combination with a main frame, a power driven supporting and driving means for the frame, and a manually controllable steering means for the frame, all of the said parts being narrow and adapted to travel between two rows of plants; of two wheel supported auxiliary frames located at opposite sides of the main frame and each arched to pass over a row of plants; four groups of cultivating tools of which two are carried by the main frame and two by the respective auxiliary frames; means operable from the main frame for moving the cultivating tools vertically into or out of ground engaging positions; and means for laterally adjusting the tools of any group independently of the others.

20. In a cultivator of the class described, the combination with a main frame, a power driven supporting and driving means for the frame, and a manually controllable steering means for the frame, all of the said parts being narrow and adapted to travel between two rows of plants; of two wheel supported auxiliary frames located at opposite sides of the main frame and each arched to pass over a row of plants; four groups of cultivating tools of which two are carried by the main frame and two by the respective auxiliary frames; means for vertically moving the cultivating tools of any group independently of the others into or out of ground engaging position; and means for laterally adjusting the tools of any group independently of the others.

21. In a cultivator of the class described, the combination with a main frame, a power driven supporting and driving means for the frame, and a manually controllable steering means for the frame, all of the said parts being narrow and adapted to travel between two rows of plants; of two wheel supported auxiliary frames located at opposite sides of the main frame and each arched to pass over a row of plants; four tool arms pivoted for movement about vertical axes, two of the arms being carried by the main frame and two by the respective auxiliary frames; cultivating tools on the several arms; means for locking the several arms in different positions of angular adjustment; and means for vertically moving any of the said arms independently of the others to bring the corresponding cultivating tools into or out of ground engaging position.

22. In a cultivator of the class described, the combination with a main frame, a power driven supporting and driving means for the frame, and a manually controllable steering means for the frame, all of the said parts being narrow and adapted to travel between two rows of plants; of two wheel supported auxiliary frames located at opposite sides of the main frame and arched to respectively pass over two rows of plants; cultivating tools carried by the main and auxiliary frames respectively and arranged to travel along the opposite sides of the said rows of plants; and means operable from the main frame for laterally adjusting tools on opposite sides of a row of plants simultaneously and in the same directions.

23. In a cultivator of the class described, the combination with a main frame, a power driven supporting and driving means for the frame, and a manually controllable steering means for the frame, all of the said parts being narrow and adapted to travel between two rows of plants; of two wheel supported auxiliary frames located at opposite sides of the main frame and arched to respectively pass over two rows of plants; cultivating tools carried by the main and auxiliary frames respectively and arranged to travel along the opposite sides of the said rows of plants; means operable from the main frame for laterally adjusting tools on opposite sides of a row of plants simultaneously and in the same directions, and supplemental means tending to hold the said tools in predetermined normal positions.

24. In a cultivator of the class described, the combination with a main frame, a power driven supporting and driving means for the frame, and a manually controllable steering means for the frame, all of the said parts being narrow and adapted to travel between two rows of plants; of two wheel supported auxiliary frames located at opposite sides of the main frame and arched to respectively pass over two rows of plants; four tool arms pivoted for movement about vertical axes, two of the arms being carried by the main frame and two by the respective auxiliary frames; cultivating tools on the several arms and arranged to travel along opposite sides of the said rows of plants; and means operable from the main frame for angularly adjusting the two arms on opposite sides of a row of plants simultaneously and in the same directions.

25. In a cultivator of the class described, the combination with a main frame, a power driven supporting and driving means for the frame, and a manually controllable steering means for the frame, all of the said parts being narrow and adapted to travel between two rows of plants; of two wheel supported auxiliary frames located at opposite sides of the main frame and arched to respectively pass over two rows of plants; cultivating tools carried by the main and auxiliary frames respectively and arranged to travel along the opposite sides of the said rows of plants; means operable from the main frame for laterally adjusting tools on opposite sides of a row of plants simultaneously and in the same directions; and supplemental means whereby preliminary lateral adjustments of the said tools may be effected.

26. In a cultivator of the class described, the combination with a main frame, a power driven supporting and driving means for the frame, and a manually controllable steering means for the frame, all of the said parts being narrow and adapted to travel between two rows of plants; of two wheel supported auxiliary frames located at opposite sides of the main frame and arched to respectively pass over two rows of plants; cultivating tools carried by the main and auxiliary frames respectively and arranged to travel along the opposite sides of the said rows of plants; and two separate means independently operable from the main frame for laterally adjusting tools on opposite sides of the respective rows simultaneously and in the same directions.

27. In a cultivator of the class described, the combination with a main frame, a power driven supporting and driving means for the frame, and a manually controllable steering means for the frame, all of the said parts being narrow and adapted to travel between two rows of plants; of two wheel supported auxiliary frames located at opposite sides of the main frame and arched to respectively pass over two rows of plants; cultivating tools carried by the main and auxiliary frames respectively and arranged to travel along the opposite sides of the said rows of plants; two separate means independently operable from the main frame for laterally adjusting tools on opposite sides of the respective rows simultaneously and in the same directions and means for moving the said tools vertically to bring them into or out of ground engaging positions.

28. In a cultivator of the class described, the combination with a main frame, a power driven supporting and driving means for the frame, and a manually controllable steering means for the frame, all of the said parts being narrow and adapted to travel between two rows of plants; of two wheel supported auxiliary frames located at opposite sides of the main frame and arched to respectively pass over two rows of plants; cultivating tools carried by the main and auxiliary frames respectively and arranged to travel along the opposite sides of the said rows of plants, some of the said tools being normally fixed against lateral movement and others being freely movable laterally; and two separate means independently operable from the main frame for laterally adjusting the last said tools on opposite sides of the respective rows simultaneously and in the same directions.

29. In a cultivator of the class described, the combination with a main frame, a power driven supporting and driving means for the frame, and a manually controllable steering means for the frame, all of the said parts being narrow and adapted to travel between two rows of plants; of two wheel supported auxiliary frames located at opposite sides of the main frame and arched to respectively pass over two rows of plants; cultivating tools carried by the main and auxiliary frames respectively and arranged to travel along the opposite sides of the said rows of plants, some of the said tools being normally fixed against lateral movement and others being freely movable laterally; two separate means independently operable from the main frame for laterally adjusting the last said tools on opposite sides of the respective rows simultaneously and in the same directions and means whereby the said normally fixed tools can be laterally adjusted and held in adjusted positions.

In testimony whereof I affix my signature.

J HARTLEY NIXON.